US012732908B2

(12) United States Patent
Sun et al.

(10) Patent No.: US 12,732,908 B2
(45) **Date of Patent: *Sep. 8, 2026**

(54) SCell ACTIVATION ENHANCEMENT WITH ASSISTANCE REFERENCE SIGNAL

(71) Applicant: Apple Inc., Cupertino, CA (US)

(72) Inventors: Haitong Sun, Saratoga, CA (US); Chunhai Yao, Beijing (CN); Chunxuan Ye, San Diego, CA (US); Dawei Zhang, Saratoga, CA (US); Hong He, San Jose, CA (US); Huaning Niu, San Jose, CA (US); Jie Cui, San Jose, CA (US); Oghenekome Oteri, San Diego, CA (US); Sigen Ye, San Diego, CA (US); Wei Zeng, Saratoga, CA (US); Weidong Yang, San Diego, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 230 days.

This patent is subject to a terminal disclaimer.

(21) Appl. No.: 18/502,570

(22) Filed: Nov. 6, 2023

(65) Prior Publication Data

US 2024/0073813 A1 Feb. 29, 2024

Related U.S. Application Data

(63) Continuation of application No. 18/247,354, filed as application No. PCT/CN2020/119791 on Oct. 2, 2020.

(51) Int. Cl.
*H04W 52/02* (2009.01)
*H04L 5/00* (2006.01)
(Continued)

(52) U.S. Cl.
CPC ....... *H04W 52/0206* (2013.01); *H04L 5/0051* (2013.01); *H04W 72/232* (2023.01); *H04W 76/20* (2018.02)

(58) Field of Classification Search
None
See application file for complete search history.

(56) References Cited

U.S. PATENT DOCUMENTS

2013/0114583 A1 5/2013 Park et al.
2014/0140293 A1* 5/2014 Sharma .................. H04L 5/001 370/329

(Continued)

FOREIGN PATENT DOCUMENTS

CN 110785958 2/2020
CN 111480358 7/2020

(Continued)

*Primary Examiner* — Otis L Thompson, Jr.
(74) *Attorney, Agent, or Firm* — Fay Kaplun & Marcin, LLP

(57) ABSTRACT

A user equipment is configured to receive a reference signal when secondary cell (SCell is to be activated. The UE receives a secondary cell (SCell) activation indication for activating an SCell, receives a reference signal (RS) triggering indication for triggering an RS prior to an expected SCell activation period, performs measurements on the triggered RS and activates the SCell based on the RS measurements.

20 Claims, 9 Drawing Sheets

(51) Int. Cl.

| | |
|---|---|
| ***H04W 72/232*** | (2023.01) |
| ***H04W 76/20*** | (2018.01) |

(56) References Cited

U.S. PATENT DOCUMENTS

| | | | | |
|---|---|---|---|---|
| 2015/0236825 | A1* | 8/2015 | Park | H04L 1/20 370/329 |
| 2016/0302228 | A1* | 10/2016 | Kazmi | H04L 5/0055 |
| 2017/0303288 | A1* | 10/2017 | Li | H04L 5/001 |
| 2019/0200413 | A1 | 6/2019 | Hong | |
| 2019/0215117 | A1* | 7/2019 | Lee | H04L 5/0094 |
| 2019/0261444 | A1* | 8/2019 | Axmon | H04W 76/28 |
| 2019/0296805 | A1* | 9/2019 | Son | H04W 76/27 |
| 2019/0356444 | A1* | 11/2019 | Noh | H04W 72/23 |
| 2020/0145062 | A1 | 5/2020 | Jung et al. | |
| 2020/0177336 | A1* | 6/2020 | Li | H04W 72/54 |
| 2020/0336227 | A1 | 10/2020 | Takeda et al. | |
| 2020/0374800 | A1 | 11/2020 | Dinan | |
| 2021/0274535 | A1 | 9/2021 | Yi et al. | |
| 2021/0297951 | A1* | 9/2021 | Lin | H04W 52/0225 |
| 2021/0337560 | A1* | 10/2021 | Xiao | H04W 72/0453 |
| 2021/0377852 | A1* | 12/2021 | Zhou | H04W 52/0235 |
| 2022/0095127 | A1* | 3/2022 | Tang | H04L 5/0098 |
| 2022/0104056 | A1* | 3/2022 | Takeda | H04L 5/0051 |
| 2022/0191892 | A1 | 6/2022 | Muruganathan et al. | |
| 2022/0248329 | A1* | 8/2022 | Peng | H04W 52/0216 |
| 2022/0271899 | A1* | 8/2022 | Hsieh | H04W 72/20 |
| 2022/0377770 | A1 | 11/2022 | Li | |
| 2023/0362852 | A1* | 11/2023 | He | H04L 5/001 |

FOREIGN PATENT DOCUMENTS

| | | |
|---|---|---|
| WO | 2016/149167 | 9/2016 |
| WO | 2019/075315 | 4/2019 |

* cited by examiner

400

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |

Figure 6A:
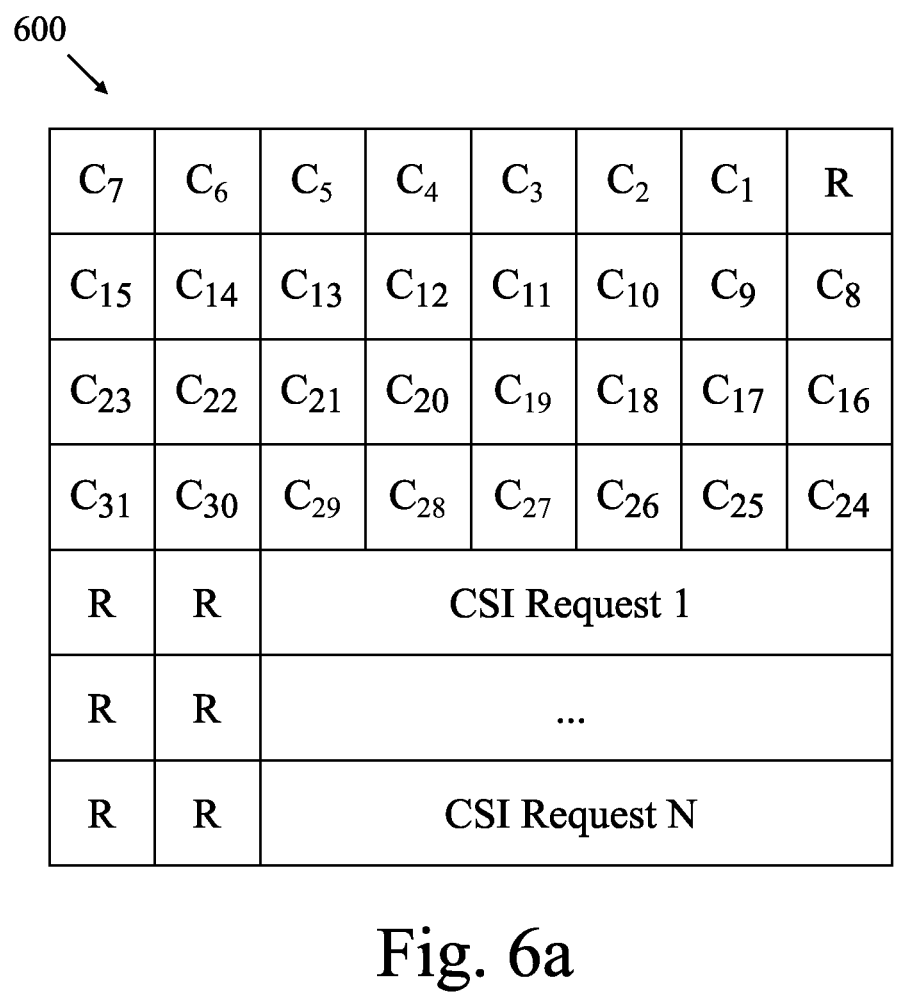

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| R | R | CSI Request 1 | | | | | |
| R | R | ... | | | | | |
| R | R | CSI Request N | | | | | |

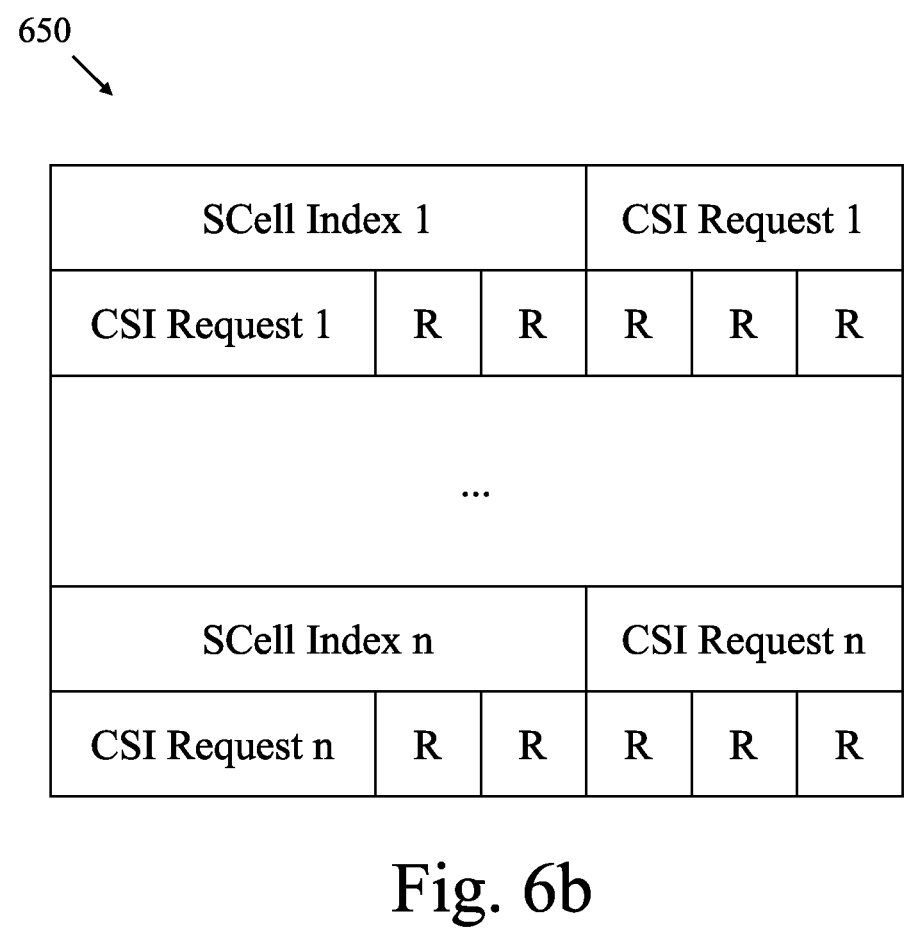

<table>
<tr><td colspan="3">SCell Index 1</td><td colspan="3">CSI Request 1</td></tr>
<tr><td>CSI Request 1</td><td>R</td><td>R</td><td>R</td><td>R</td><td>R</td></tr>
<tr><td colspan="6">...</td></tr>
<tr><td colspan="3">SCell Index n</td><td colspan="3">CSI Request n</td></tr>
<tr><td>CSI Request n</td><td>R</td><td>R</td><td>R</td><td>R</td><td>R</td></tr>
</table>

Fig. 6b

SCell ACTIVATION ENHANCEMENT WITH ASSISTANCE REFERENCE SIGNAL

TECHNICAL FIELD

This application relates generally to wireless communication systems, and in particular relates to an SCell activation enhancement with assistance reference signal.

BACKGROUND INFORMATION

A user equipment (UE) may be configured with a variety of different capabilities. For example, the UE may be capable of establishing a connection with a network, e.g. a 5G New Radio (NR) network. While connected to the 5G NR network, the UE may utilize capabilities associated with the network. For example, the UE may utilize a carrier aggregation (CA) functionality in which a primary component carrier (PCC) and at least one secondary component carrier (SCC) are used to communicate data over the various NR bands. The network component to which the UE has connected may be a next generation Node B (gNB) acting as a primary cell (PCell) and providing the PCC. A second network component may act as a secondary cell (SCell) and provide at least one SCC.

In the current NR standards, an SCell can be activated or deactivated for a UE based on a medium access control layer (MAC) control element (MAC-CE) configured by the network. Upon receiving a MAC-CE that activates an SCell, the UE is expected to perform the configured activation 3 ms after transmitting a HARQ acknowledgement (HARQ-ACK) on the UL for the MAC-CE. When the SCell is deactivated for a long duration, the UE can lose the timing and frequency tracking of the SCell. Furthermore, for FR2, the UE may also lose the correct beam for the SCell. As a result, the UE may take much longer than 3 ms to become fully operational in the SCell.

SUMMARY

Some exemplary embodiments are related to one or more processors configured to perform operations. The operations include receiving a secondary cell (SCell) activation indication for activating an SCell, receiving a reference signal (RS) triggering indication for triggering an RS prior to an expected SCell activation period, performing measurements on the triggered RS and activating the SCell based on the RS measurements.

Other exemplary embodiments are related to a user equipment (UE) having a transceiver configured to connect to a base station and one or more processors communicatively coupled to the transceiver and configured to perform operations. The operations include receiving a secondary cell (SCell) activation indication for activating an SCell, receiving a reference signal (RS) triggering indication for triggering an RS prior to an expected SCell activation period, performing measurements on the triggered RS and activating the SCell based on the RS measurements.

BRIEF DESCRIPTION OF THE DRAWINGS

FIG. 4 shows an existing SCell activation/deactivation Medium Access Control Control Element (MAC-CE).

FIG. 6*a* shows a new MAC-CE according to a first option.

FIG. 6*b* shows a new MAC-CE according to a second option.

DETAILED DESCRIPTION

Figure 1:
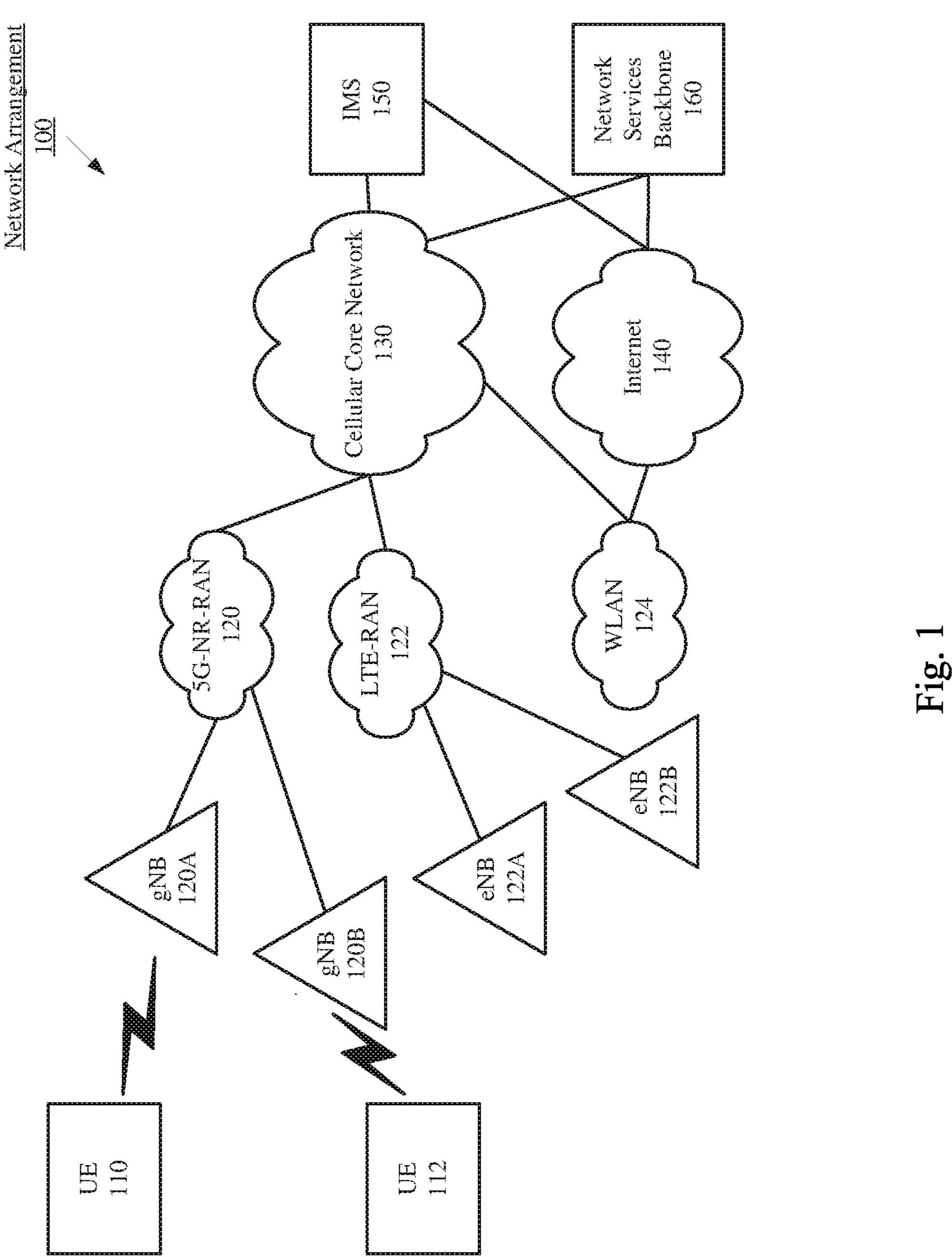
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe systems and methods for fast activation of a secondary cell (SCell), the method including a reference signal (RS) transmission prior to SCell activation to assist a user equipment (UE) in performing operations including timing and frequency error tracking, beam refinement, and other procedures affecting the amount of time it takes for the UE to become fully operational within the activated SCell.

According to various exemplary embodiments described herein, a network cell may trigger an assistance RS and the UE may monitor for and perform measurements on the assistance RS, prior to an expected SCell activation period, which may reduce the activation delay for the SCell, particularly after a long period in the inactive state. The exemplary embodiments further relate to implementation details of the assistance RS, including timing restrictions and quasi co-location (QCL) configurations for the RS.

Network/Devices

FIG. 1 shows an exemplary network arrangement 100 according to various exemplary embodiments. The exemplary network arrangement 100 includes a plurality of UEs 110, 112. Those skilled in the art will understand that the UEs may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of two UEs 110, 112 is merely provided for illustrative purposes. In some of the exemplary embodiments described below, groups of UEs may be employed to conduct respective channel measurements.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. Therefore, the UEs 110, 112 may include a 5G NR chipset to communicate with the 5G NR-RAN 120, an LTE chipset to communicate with the LTE-RAN 122 and an ISM chipset to communicate with the WLAN 124. However, the UEs 110, 112 may also communicate with other types of networks (e.g. legacy cellular networks) and the UE 110 may also communicate with networks over a wired connection. With regard to the exemplary embodiments, the UEs 110, 112 may establish a connection with the 5G NR-RAN 120 and/or the LTE-RAN 122.

The 5G NR-RAN 120 and the LTE-RAN 122 may be portions of cellular networks that may be deployed by cellular providers (e.g., Verizon, AT & T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN 120 via at least one of the next generation nodeB (gNB) 120A and/or the gNB 120B. The exemplary embodiments may apply to any appropriate number of gNBs. For example, the UEs 110, 112 may simultaneously connect to and exchange data with a plurality of gNBs in a multi-cell CA configuration. The UEs 110, 112 may also connect to the LTE-RAN 122 via either or both of the eNBs 122A, 122B, or to any other type of RAN, as mentioned above. In the network arrangement 100, the UE 110 is shown as having a connection to the gNB 120A, while the UE 112 is shown as having a connection to gNB 120B.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
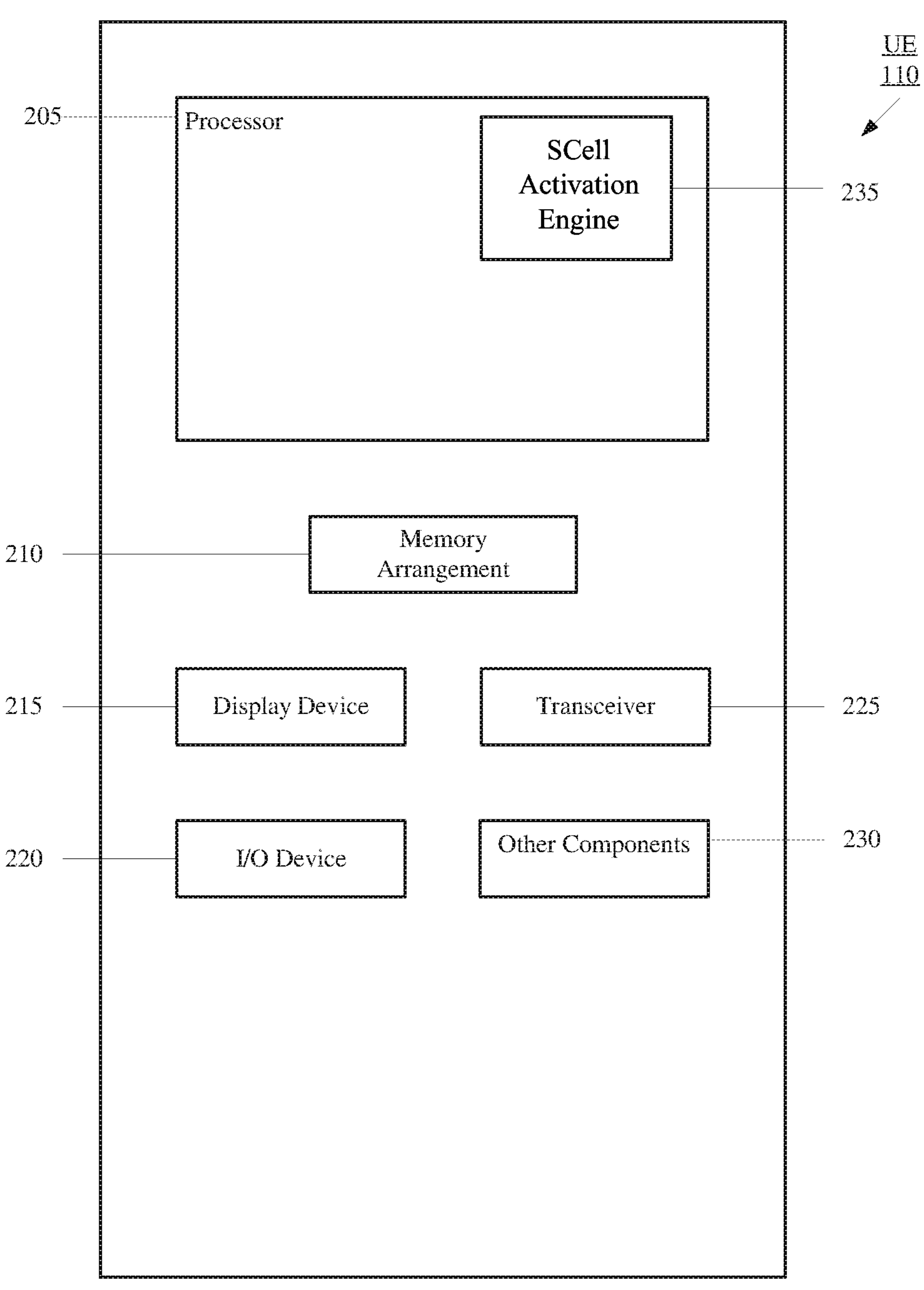
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. The UE 110 illustrated in FIG. 2 may also represent the UE 112.

The processor 205 may be configured to execute a plurality of engines for the UE 110. For example, the engines may include an SCell activation engine 235 for performing operations including receiving SCell activation and reference signal (RS) triggers from the network, monitoring for and performing measurements on the triggered RS, and performing fast SCell activation based on the RS measurements, to be described in detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies). For example, the transceiver 225 may operate on the unlicensed spectrum when e.g. NR-U is configured.

Figure 3:
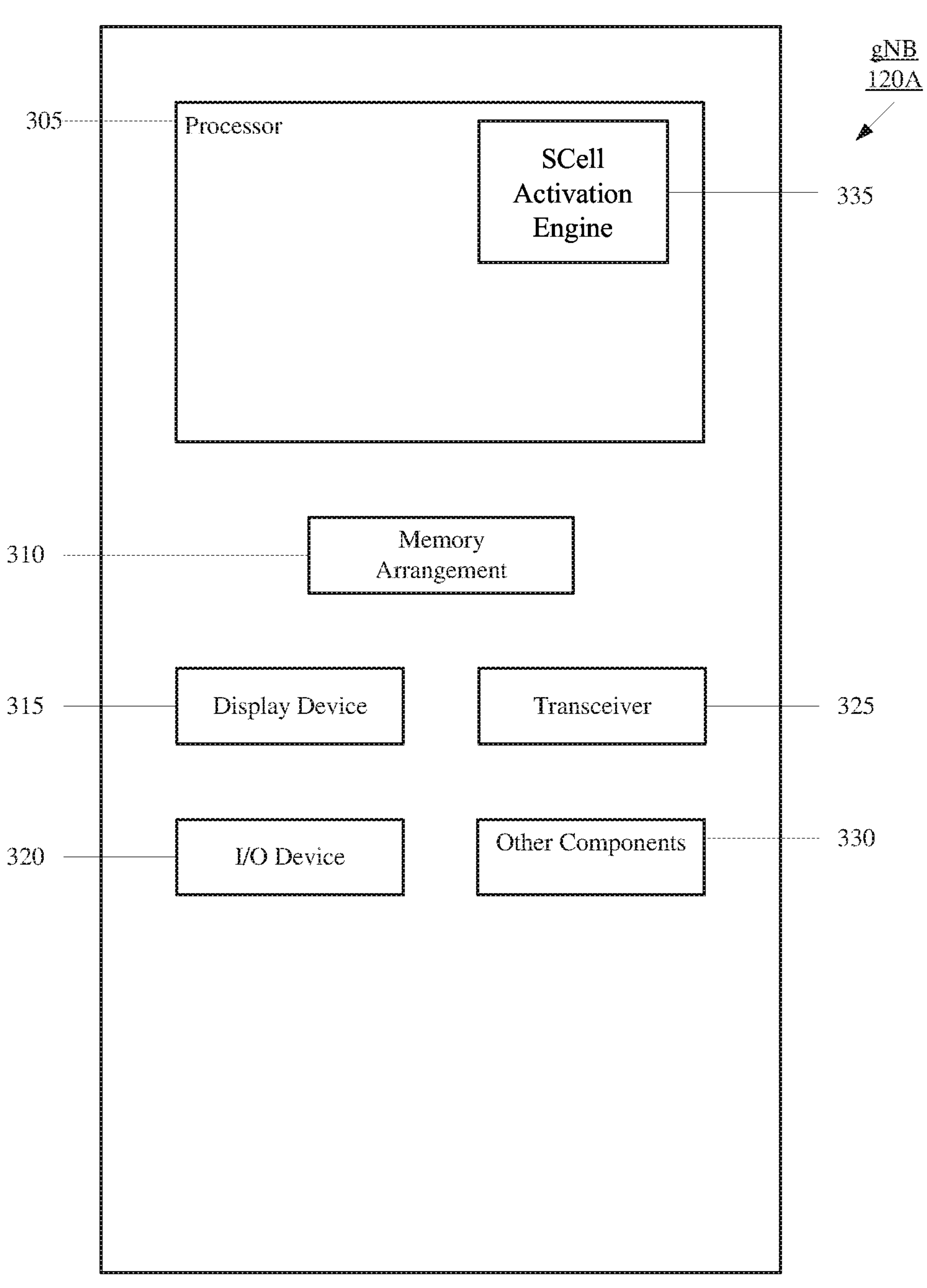
FIG. 3 shows an exemplary network cell according to various exemplary embodiments.

FIG. 3 shows an exemplary network cell, in this case gNB 120A, according to various exemplary embodiments. As noted above with regard to the UE 110, the gNB 120A may represent a cell providing services as a PCell or an SCell, or in a standalone configuration with the UE 110. The gNB 120A may represent any access node of the 5G NR network through which the UEs 110, 112 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include an SCell activation engine 335 for performing operations including configuring an assistance reference signal (RS) for a UE and transmitting an SCell activation indication to the UE so that the UE may measure the RS to assist the UE with fast SCell activation, to be described in detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

SCell Activation Enhancement

The exemplary embodiments are described with regard to carrier aggregation performed at a 5G NR network and including SCell activation mechanisms. However, the use of the 5G NR network is only exemplary. The exemplary embodiments may be modified and/or used with any network that supports carrier aggregation (CA) or a substantially similar functionality in which a plurality of component carriers (CCs) is used.

CA may include a primary component carrier (PCC) and at least one secondary component carrier (SCC) that correspond to the same radio access technology (RAT) being used to facilitate communication with the network. In addition, in 5G NR, Eutra NR Dual Connectivity (ENDC) may be enabled where a connection is established with both the 5G NR RAT and the LTE RAT, and the exemplary embodiments may be used. The PCC may be used, in part, for control information such as scheduling requests, uplink grants, downlink grants, etc. CA functionality enables the PCC and at least one SCC to combine bandwidths to exchange data with the UE. Thus, with CA, the PCC may provide a first portion of a total bandwidth for data to be exchanged while the SCC may provide a second portion of the total bandwidth. The combination of a PCC and a single SCC may be characterized as a CC combination that includes two carriers. To further increase the total available bandwidth for data to be exchanged with the UE, additional SCCs may be incorporated. For example, with CA for LTE, there may be CC combinations that include, but are not limited to, two carriers, four carriers, five carriers, eight carriers, ten carriers, thirty-two carriers, etc. With CA for 5G NR there may be CC combinations that include, but are not limited to, two carriers, five carriers, ten carriers, twelve carriers, sixteen carriers, twenty carriers, twenty-five carriers, thirty-two carriers, sixty-four carriers, etc.

The exemplary system may be configured with CA functionality and comprise a PCell providing a PCC and at least one SCell respectively providing an SCC. The PCell may control how data is exchanged with the UE, such as how the PCC and any SCCs are to be used in the CA functionality. When the UE is CA capable, the CA functionality enables the PCell and a further SCell to combine bandwidths to exchange data with the UE to increase a rate of data exchange. Thus, with CA, the PCell may provide a first portion of a total bandwidth for data to be exchanged while the SCell may provide a second portion of the total bandwidth. When further SCells are used, the PCell may provide the first portion of the total bandwidth, the first SCell may provide the second portion of the total bandwidth, a second SCell may provide a third portion of the total bandwidth, and so on.

With regard to a particular SCell, a UE and the SCell may be configured in a non-dormant (activated) state, a dormant (activated) state and a deactivated state relative to the connection therebetween. In the non-dormant activated state, the UE may be configured for 1) monitoring of the physical downlink control channel (PDCCH), 2) transmission of sounding reference signals (SRSs), a radio access channel (RACH), a physical uplink shared channel (PUSCH) and a physical downlink shared channel (PDSCH), 3) beam management and CSI measurement, and 4) automatic gain control (AGC). In the dormant state, the UE may be configured for 3) beam management and CSI measurement and 4) AGC, but not for 1) PDCCH monitoring or 2) transmission as described above. In the deactivated state, the UE is not configured for any of the functions 1)-4) described above.

In the current NR standards, an SCell can be activated and deactivated based on a MAC-CE, which is defined in TS 38.321, section 6.1.3.10 "SCell Activation/Deactivation MAC-CEs." FIG. 4 shows an existing SCell activation/deactivation MAC-CE 400 comprising four octets containing 31 C-fields and one R-field. A C-field set to 1 indicates the SCell with the corresponding SCell index shall be activated, and a C-field set to 0 indicates the SCell with the corresponding SCell index shall be deactivated. Thus, up to 31 SCells may be activated/deactivated with the MAC-CE 400. Upon receiving the MAC-CE 400 that activates the SCell, the UE is expected to perform the configured activation/deactivation 3 ms after transmitting a HARQ acknowledgement (HARQ-ACK) on the UL for the corresponding MAC-CE. When the SCell is deactivated for a long duration, the UE can lose the timing and frequency tracking of the SCell. Furthermore, for FR2, the UE may also lose the correct beam for the SCell. As a result, the UE may take much longer than 3 ms to become fully operational in the SCell, since NR removes the 'always on' signal, e.g. the cell-specific reference signal (CRS) in LTE.

Figures 5A, 5B:
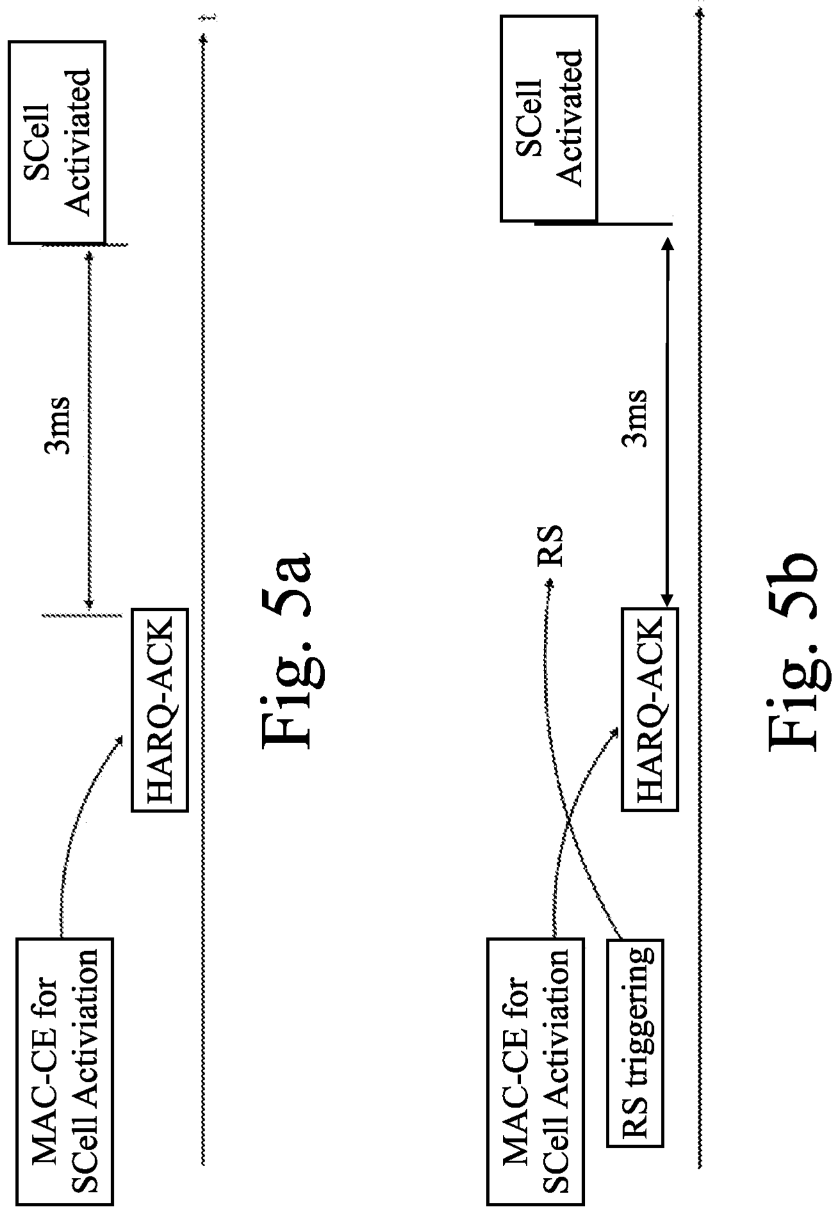
FIG. 5*a* shows a diagram for SCell activation based on the existing MAC-CE.
FIG. 5*b* shows a diagram for SCell activation based on a MAC-CE and including an assistance reference signal (RS), according to various exemplary embodiments described herein.

FIG. 5*a* shows a diagram 500 for SCell activation based on the existing MAC-CE 400. As noted above, a high activation delay (longer than 3 ms) may result from the existing SCell activation scheme. It may be beneficial for the UE to be provided with an RS burst before the SCell activation and after the MAC-CE, so that the UE can quickly perform timing and frequency tracking, beam refinement, etc. on the SCell for fast SCell activation.

According to various exemplary embodiments described herein, an assistance reference signal (RS) may be used before SCell activation to serve one or more or all of the following purposes. The assistance RS may provide fast AGC adjustment, fast timing and frequency error tracking, fast beam refinement and fast CSI measurement for the activated SCell. The assistance RS may be an aperiodic (AP) tracking reference signal (TRS), a periodic (P) TRS, a semi-persistent (SP) TRS, an AP CSI-RS, a P CSI-RS or an SP CSI-RS. FIG. 5*b* shows a diagram 550 for SCell activation based on a MAC-CE and including an assistance reference signal (RS), according to various exemplary embodiments described herein. As shown in FIG. 5*b*, an RS may be triggered prior to the HARQ-ACK transmission so that the UE may monitor for the RS during the time period between HARQ-ACK transmission and SCell activation. Although the RS triggering is shown in FIG. 5*b* as occurring at the same time as the receipt of the MAC-CE, in some embodiments, the RS triggering may also occur before or after the MAC-CE, to be described in further detail below.

According to some exemplary embodiments, the assistance RS can be triggered with the existing SCell activation MAC-CE 400. In this embodiment, an AP-TRS associated with an SCell is configured by the radio resource control (RRC) layer, the configuration including the time and frequency domain resource allocation within a slot and the slot offset. When the slot offset collides with uplink (UL) symbols, the UE can assume that the AP-TRS is transmitted in the next available valid slot not violating any duplexing direction restriction. When the MAC-CE activates the SCell, the UE can assume that the corresponding AP-TRS configured by the RRC will be transmitted. The corresponding AP-TRS can be released by the RRC or deactivated by MAC-CE.

In other exemplary embodiments, the assistance RS can be triggered with a combination of existing MAC-CEs, for example, a combination of the SCell Activation/Deactivation MAC-CE 400 and a SP CSI-RS/CSI-IM Resource Set Activation/Deactivation MAC-CE for performing an interference measurement on the SCell. This embodiment allows the network to activate an SCell and an SP-RS at the same time for fast SCell activation.

In still further exemplary embodiments, a new MAC-CE may be used to activate the SCell and trigger the AP-TRS simultaneously. FIG. 6*a* shows a new MAC-CE 600 according to a first option. The first MAC-CE 600 includes 31 C-fields and one R-field, similar to the existing SCell activation/deactivation MAC-CE 400 discussed above, wherein when Ci=1 the i-th SCell is activated. For each Ci that is 1, in increasing order of i, the MAC-CE 600 also triggers the corresponding AP-TRS via the CSI request field, which has a maximum 6 bits to index one out of 64 RRC-configured AP-TRS. The bit width of the CSI request may also be changed based on a reportTriggerSize parameter configured by the RRC layer.

FIG. 6*b* shows a new MAC-CE 650 according to a second option. The second MAC-CE 650 includes a five bit SCell index field and a six bit CSI request field for each activated SCell. The SCell index indicates the SCell that is to be activated and the CSI request indicates the AP-TRS that is to be triggered. Similar to above, the bit width of the CSI request may be changed based on a reportTriggerSize parameter configured by the RRC layer.

In further exemplary embodiments, a scheduling DCI for the SCell activation/deactivation MAC-CE 400 may be used to trigger the AP-TRS. For example, a modified downlink (DL) DCI format 1_0, 1_1 or 1_2 may include a CSI request field. The CSI request field may be any of 0, 1, 2, 3, 4, 5 or 6 bits configurable by a reportTriggerSize parameter configured by the RRC layer.

In additional exemplary embodiments, a slot offset may be set between the DCI that triggers the AP-TRS and the actual transmission of the AP-TRS. The slot offset may be indicated in the DCI or the SCell activation/deactivation MAC-CE.

In other exemplary embodiments, an uplink (UL) DCI can be used to both trigger the AP-TRS and activate the SCell. The AP-TRS triggering functionality is already supported by the current CSI request field in UL DCI. To activate the SCell, a new field is introduced in the UL DCI, to either activate one SCell at a time or activate multiple SCells at a time.

Figures 7, 8:
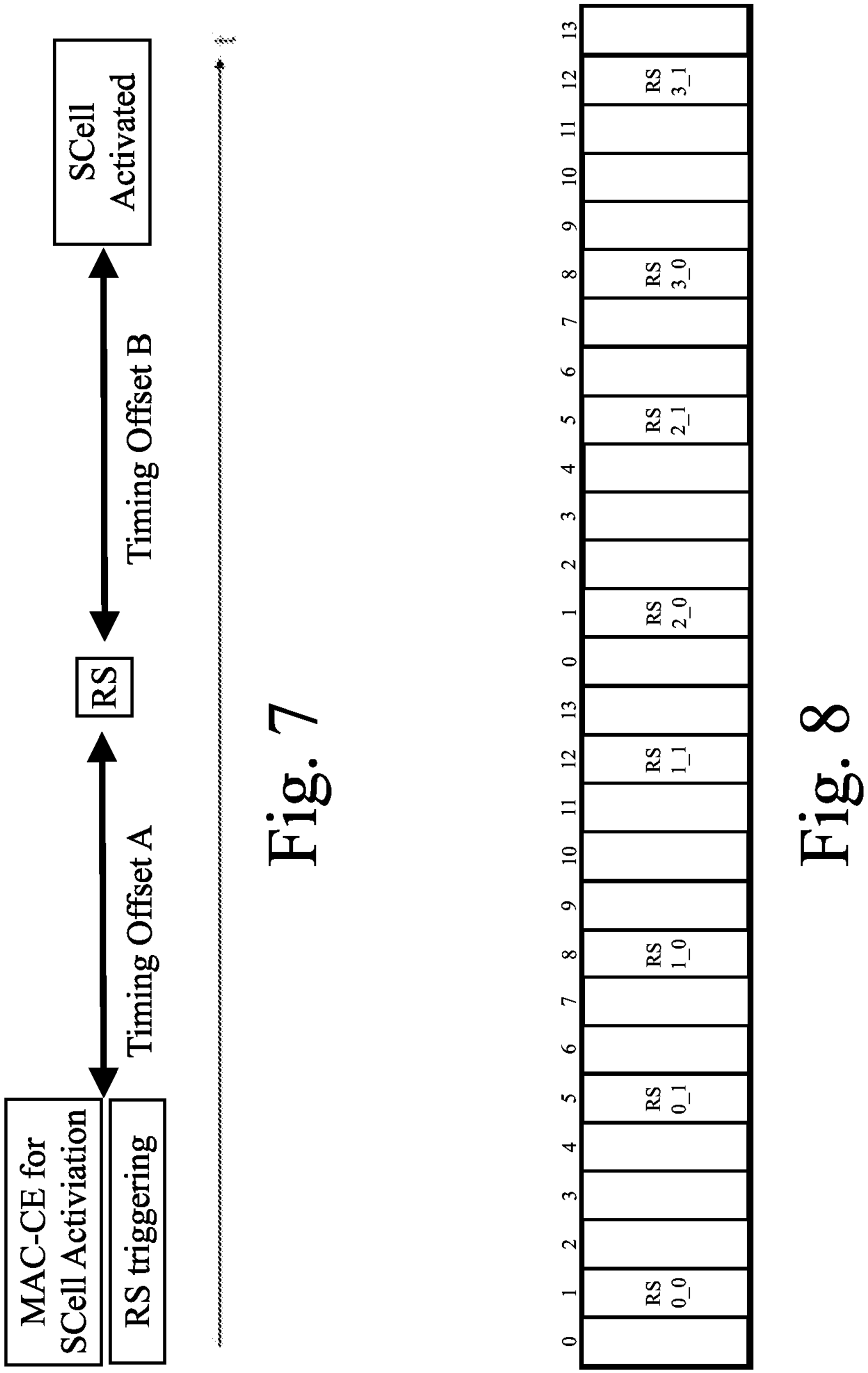
FIG. 7 shows a diagram for RS-assisted SCell activation including a first and second timing offset.
FIG. 8 shows a diagram including a set of multiple pairs of RSs configured with a QCL relationship for timing and frequency tracking.

Timing restrictions may be introduced to the embodiments discussed above for UE power saving. FIG. 7 shows a diagram 700 for RS-assisted SCell activation including a first and second timing offset. The first timing offset 705 (timing offset A) may be defined from the triggering of the RS to the actual transmission of the RS. In one embodiment, the first timing offset may be configured so that a triggered RS cannot be transmitted before the slot that carries the RS triggering command. In another embodiment, the first timing offset may be configured so that the triggered RS cannot be transmitted before the beginning of the transmission of the RS triggering command. In still another embodiment, the timing offset may be configured so that the triggered RS cannot be transmitted before the end of the transmission of the RS triggering command.

The minimum timing offset A may be either defined by a standard (e.g., 3GPP standards), potentially as a function of subcarrier spacing (SCS), or reported as a UE capability.

The second timing offset 710 (timing offset B) may be defined from the end of the triggered RS to the expected activation of the SCell. Similar to the timing offset A, the minimum timing offset B may be either defined by a standard (e.g., 3GPP standards), potentially as a function of SCS, or reported as UE capability.

The triggered RS in the embodiments discussed above may be defined as quasi co-located (QCL) to either a synchronization signal block (SSB) or a P-TRS. The QCL relationship may be used to improve timing/frequency error tracking and beam refinement at the UE.

Multiple triggered RSs may be configured to achieve the above-mentioned purposes. FIG. 8 shows a diagram 800 including a set of multiple pairs of RSs configured with a QCL relationship for timing and frequency tracking. The diagram 800 includes four pairs of RS 805*a-d* having three symbols between the first and second RS of each pair, similar to TRS design. Multiple pairs may be configured, wherein each pair corresponds to a same transmit beam.

Figure 9:
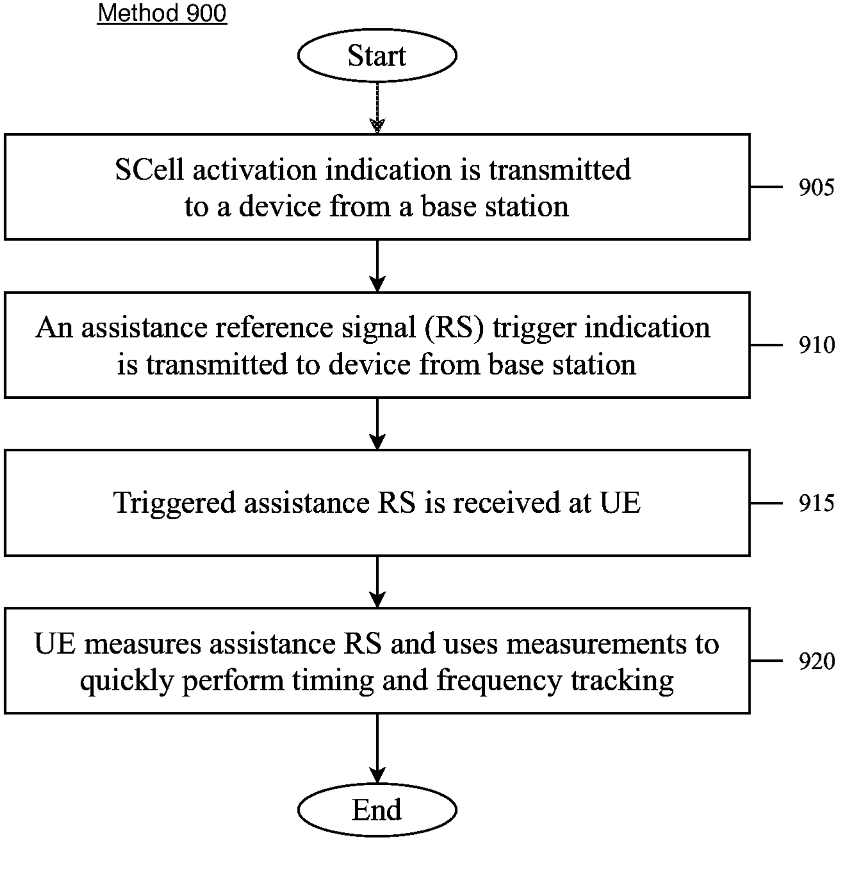
FIG. 9 shows a method for RS-assisted SCell activation according to various exemplary embodiments described herein.

FIG. 9 shows a method 900 for RS-assisted SCell activation according to various exemplary embodiments described herein. In 905, an SCell activation indication is transmitted to a device, e.g. a user equipment (UE), from a base station, e.g. a gNB. In some embodiments, as discussed above, the SCell activation may be triggered by an SCell activation/deactivation MAC-CE, while in another embodiment the SCell may be triggered by a UL DCI.

In 910, an assistance reference signal (RS) trigger indication is transmitted to the device from the base station so that the UE may determine when to monitor for the assistance RS. The RS trigger may be transmitted before, simultaneously with, or after the SCell activation indication discussed above in 905. For example, as discussed above, the RS may be triggered with an existing SCell activation/deactivation MAC-CE, a new or modified SCell activation/deactivation MAC-CE, a DL DCI or a UL DCI.

In 915, the triggered assistance RS is received at the UE. In some embodiments, as discussed above, the assistance RS is an AP-TRS. In some embodiments, the triggered RS is subject to a timing restriction.

In 920, the UE measures the assistance RS and uses the measurements to quickly perform timing and frequency tracking, beam refinement, etc. for fast SCell activation. The assistance RS may be configured as QCL to an SSB or P-TRS to further assist the above-mentioned operations.

EXAMPLES

In a first example, the exemplary embodiments include one or more processors configured to perform operations comprising, transmitting a secondary cell (SCell) activation indication for activating an SCell for a user equipment (UE) and transmitting a reference signal (RS) triggering indication for triggering an RS prior to an expected SCell activation period, wherein the UE performs measurements on the triggered RS and activates the SCell based on the RS measurements.

In a second example, the one or more processors of the first example, wherein the SCell activation is indicated by a medium access control layer (MAC) control element (MAC-CE).

In a third example, the one or more processors of the second example, wherein the operations further comprise transmitting a radio resource control (RRC) configuration for the RS, the configuration comprising a resource allocation and slot offset for the RS, wherein the UE receiving the MAC-CE SCell activation triggers the RS.

In a fourth example, the one or more processors of the second example, wherein the operations further comprise transmitting a further MAC-CE for channel state information (CSI) resource activation, wherein the UE receiving the MAC-CE SCell activation and further MAC-CE CSI resource activation triggers the RS.

In a fifth example, the one or more processors of the second example, wherein the MAC-CE includes a plurality of fields for indicating an SCell and a field for triggering the RS for each of the indicated SCells.

In a sixth example, the one or more processors of the second example, wherein the operations further comprise transmitting a scheduling downlink control information (DCI) for the MAC-CE, the DCI including a field for triggering the RS of the SCell.

In a seventh example, the one or more processors of the sixth example, wherein a slot offset between the scheduling DCI and the RS transmission is indicated in the scheduling DCI or the MAC-CE.

In an eighth example, the one or more processors of the first example wherein the SCell activation and the RS triggering are indicated in an uplink (UL) DCI.

In an ninth example, the one or more processors of the first example wherein the operations further comprise determining a first scheduling offset between the RS triggering indication to the RS transmission and a second scheduling offset between the RS transmission to the expected activation of the SCell.

In a tenth example, the one or more processors of the first example, wherein a minimum scheduling offset is reported as a UE capability or hardcoded in the standard.

In an eleventh example, the one or more processors of the first example wherein the triggered RS is configured with a quasi co-location (QCL) relationship with a synchronization signal block (SSB) or a periodic tracking reference signal (P-TRS).

In a twelfth example, the one or more processors of the first example wherein the expected SCell activation period is 3 ms after a hybrid automatic repeat request (HARQ) acknowledgement (HARQ-ACK) transmission for the SCell activation indication.

In a thirteenth example, the one or more processors of the first example wherein the triggered RS is one of an aperiodic (AP) tracking reference signal (TRS), a periodic (P) TRS, a semi-persistent (SP) TRS, an AP CSI-RS, a P CSI-RS or an SP CSI-RS.

In a fourteenth example, the one or more processors of the first example wherein the UE activating the SCell based on the RS measurements includes using the measurements for automatic gain control (AGC) adjustment, timing and frequency error tracking, beam refinement and control state information (CSI) measurements for the activated SCell.

In a fifteenth example, a base station comprises a transceiver configured to connect to a user equipment (UE) and one or more processors communicatively coupled to the transceiver and configured to perform operations comprising transmitting a secondary cell (SCell) activation indication for activating an SCell and transmitting a reference signal (RS) triggering indication for triggering an RS prior to an expected SCell activation period, wherein the UE performs measurements on the triggered RS and activates the SCell based on the RS measurements.

In a sixteenth example, the one or more processors of the fifteenth example wherein the SCell activation is indicated by a medium access control layer (MAC) control element (MAC-CE).

In a seventeenth example, the one or more processors of the sixteenth example wherein the operations further comprise transmitting a radio resource control (RRC) configuration for the RS, the configuration comprising a resource allocation and slot offset for the RS, wherein the UE receiving the MAC-CE SCell activation triggers the RS.

In an eighteenth example, the one or more processors of the sixteenth example wherein the operations further comprise transmitting a further MAC-CE for channel state information (CSI) resource activation, wherein the UE receiving the MAC-CE SCell activation and further MAC-CE CSI resource activation triggers the RS.

In a nineteenth example, the one or more processors of the sixteenth example wherein the MAC-CE includes a plurality of fields for indicating an SCell and a field for triggering the RS for each of the indicated SCells.

In a twentieth example, the one or more processors of the sixteenth example wherein the operations further comprise transmitting a scheduling downlink control information (DCI) for the MAC-CE, the DCI including a field for triggering the RS of the SCell, wherein a slot offset between the scheduling DCI and the RS transmission is indicated in the scheduling DCI or the MAC-CE.

In a twenty-first seventeenth example, the one or more processors of the sixteenth example wherein the SCell activation and the RS triggering are indicated in an uplink (UL) DCI.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. An apparatus comprising processing circuitry coupled to memory, the processing circuitry configured to:

transmit a medium access control (MAC)-control element (CE) comprising at least five octets, wherein a first set of the at least five octets includes four octets comprising a reserved field and 31 secondary cell (SCell) activation fields each corresponding to an SCell index, wherein a second set of the at least five octets include one or more octets each comprising a reference signal (RS) triggering field for triggering an aperiodic tracking reference signal (TRS) using a radio resource control (RRC) configured TRS index and wherein a user equipment (UE) performs measurements on the triggered aperiodic TRS and activates one or more SCells based on the MAC-CE.

2. The apparatus claim 1, wherein the processing circuitry is further configured to:

transmit a RRC configuration for the aperiodic TRS, the RRC configuration comprising a resource allocation and slot offset for the aperiodic TRS.

3. The apparatus of claim 1, wherein the processing circuitry is further configured to:

transmit a further MAC-CE for channel state information (CSI) resource activation.

4. The apparatus of claim 1, wherein the processing circuitry is further configured to:

transmit a scheduling downlink control information (DCI) for the MAC-CE.

5. The apparatus of claim 4, wherein a slot offset between the scheduling DCI and transmission of the aperiodic TRS is indicated in the scheduling DCI or the MAC-CE.

6. The apparatus of claim 1, wherein SCell activation and the aperiodic TRS triggering are indicated in an uplink (UL) downlink control information (DCI).

7. The apparatus of claim 1, wherein the processing circuitry is further configured to:

determine a first scheduling offset between the MAC-CE comprising the RS triggering field to transmission of the aperiodic TRS and a second scheduling offset between transmission of the aperiodic TRS to an expected activation of the SCell.

8. The apparatus of claim 1, wherein a minimum scheduling offset is reported as a UE capability or hardcoded in the standard.

9. The apparatus of claim 1, wherein the aperiodic TRS is configured with a quasi co-location (QCL) relationship with a synchronization signal block (SSB) or a periodic tracking reference signal (P-TRS).

10. The apparatus of claim 1, wherein an expected SCell activation period is 3 ms after a hybrid automatic repeat request (HARQ) acknowledgement (HARQ-ACK) transmission for SCell activation.

11. The apparatus of claim 1, wherein the aperiodic TRS is one of an aperiodic (AP) tracking reference signal (TRS), a periodic (P) TRS, a semi-persistent (SP) TRS, an AP CSI-RS, a P CSI-RS or an SP CSI-RS.

12. The apparatus of claim 1, wherein the UE activating the SCell based on the measurements includes using the measurements for automatic gain control (AGC) adjustment, timing and frequency error tracking, beam refinement and control state information (CSI) measurements for the SCell.

13. A base station, comprising:

a transceiver configured to communicate with a user equipment (UE); and one or more processors communicatively coupled to the transceiver and configured to perform operations comprising:

transmitting a medium access control (MAC)-control element (CE) comprising at least five octets, wherein a first set of the at least five octets includes four octets comprising a reserved field and 31 secondary cell (SCell) activation fields each corresponding to an SCell index, wherein a second set of the at least five octets include one or more octets each comprising a reference signal (RS) triggering field for triggering an aperiodic tracking reference signal (TRS) using a radio resource control (RRC) configured TRS index and wherein the UE performs measurements on the triggered aperiodic TRS and activates one or more SCells based on the MAC-CE.

14. The base station of claim 13, wherein the operations further comprise:

transmitting a radio resource control (RRC) configuration for the aperiodic TRS, the configuration comprising a resource allocation and slot offset for the aperiodic TRS.

15. The base station of claim 13, wherein the operations further comprise transmitting a further MAC-CE for channel state information (CSI) resource activation.

16. The base station of claim 13, wherein the operations further comprise;

transmitting a scheduling downlink control information (DCI) for the MAC-CE, the scheduling DCI including a field to trigger the aperiodic TRS of the SCell, wherein a slot offset between the scheduling DCI and transmission of the aperiodic TRS is indicated in the scheduling DCI or the MAC-CE.

17. The base station of claim 13, wherein SCell activation and the aperiodic TRS triggering are indicated in an uplink (UL) downlink control information (DCI).

18. The base station of claim 13, wherein the operations further comprise:

determining a first scheduling offset between the MAC-CE comprising the RS triggering field to transmission of the aperiodic TRS and a second scheduling offset between transmission of the aperiodic TRS to an expected activation of the SCell.

19. The base station of claim 13, wherein a minimum scheduling offset is reported as a UE capability or hardcoded in the standard.

20. The base station of claim 13, wherein the aperiodic TRS is configured with a quasi co-location (QCL) relationship with a synchronization signal block (SSB) or a periodic tracking reference signal (P-TRS).

* * * * *